United States Patent [19]

Abo

[11] 4,283,910
[45] Aug. 18, 1981

[54] FUEL CONTROL SYSTEM
[75] Inventor: Toshimi Abo, Yokohama, Japan
[73] Assignee: Nissan Motor Company, Limited, Kanagawa, Japan
[21] Appl. No.: 118,077
[22] Filed: Feb. 4, 1980
[30] Foreign Application Priority Data Feb. 16, 1979 [JP] Japan ................................. 54-16975

[51] Int. Cl.³ ............................................. F02C 9/32
[52] U.S. Cl. ........................ 60/39.28 R; 60/39.16 R; 290/40 C
[58] Field of Search .................. 60/39.16 R, 39.28 R; 290/40 C, 40 R

[56] References Cited

U.S. PATENT DOCUMENTS

| 4,045,955 | 9/1977 | Brannstrom | 60/39.16 R |
| 4,184,083 | 1/1980 | Takeuchi | 290/40 C |
| 4,185,203 | 1/1980 | Takeuchi | 290/40 C |
| 4,188,781 | 2/1980 | Johnson et al. | 60/39.28 R |
| 4,219,738 | 8/1980 | Griesinger | 60/39.28 R |

*Primary Examiner*—Robert E. Garrett
*Attorney, Agent, or Firm*—Lowe, King, Price & Becker

[57] ABSTRACT

A fuel control system having a fuel control valve provided in a main fuel path for controlling the amount of fuel for an injection valve, an ON-OFF valve provided in a sub-fuel path and bypassing the main fuel path for controlling the passage of the fuel from the fuel tank, and holding means for maintaining the fuel amount passing through the main fuel path nearly constant. With this construction, when an drastic or abrupt increase of load occurs, the ON-OFF valve is opened and at the same time the amount of fuel passing through the fuel control valve is maintained nearly constant by the holding means, thus preventing the engine condition from being entered into a surging limit.

6 Claims, 8 Drawing Figures

(A) LOAD

TIME (B) THE AMOUNT OF FUEL PASSING THROUGH A FUEL CONTROL VALVE

TIME (C) THE AMOUNT OF FUEL PASSING THROUGH AN OFF-ON VALVE

DRASTICALLY INCREASED FUEL
TIME (D) THE AMOUNT OF FUEL BEING SUPPLIED TO THE FUEL INJECTIONG VALVE

TIME

FUEL CONTROL SYSTEM

BACKGROUND OF THE INVENTION

The present invention relates to a fuel control system for a gas turbine, and more particularly, to a fuel control system suitable for a gas turbine for power generation.

When using a gas turbine as a power generator, a fuel control signal is determined in accordance with a difference between the actual rotational speed of its output turbine shaft and a predetermined set rotational speed thereof in order to maintain the frequency of output power of the turbine constant, thereby controlling the opening of a fuel control valve provided at a main fuel path leading to a fuel injection valve from a fuel tank in response to the fuel control signal so as to maintain the rotational speed of the output turbine constant.

However, there is a problem that when the load on the output turbine shaft drastically or abruptly increases as in the case of throwing a heavy load to a generator, the degree of opening of the fuel control valve can not be changed immediatly due to a mechanical delayed response even when the fuel control signal changes abruptly. As a result, the amount of fuel does not increase abruptly, thus lowering the frequency. In order to solve the above problem, according to the prior art, a system has been proposed in which a sub-fuel path which bypasses the fuel control valve is provided and an ON-OFF valve having a good response is provided in the sub-fuel path so as to rapidly increase the amount of fuel.

However, in this system there is a problem in that when the load abruptly increases, the total amount of the fuel passing through the fuel control valve and the one passing through the ON-OFF valve is applied to the fuel injection valve, while in this case because of the lowering of the number of rotation of the output turbine shaft during an abrupt increase of the load, the fuel control signal increases so that the opening of the fuel control valve becomes large.

Figure 1:
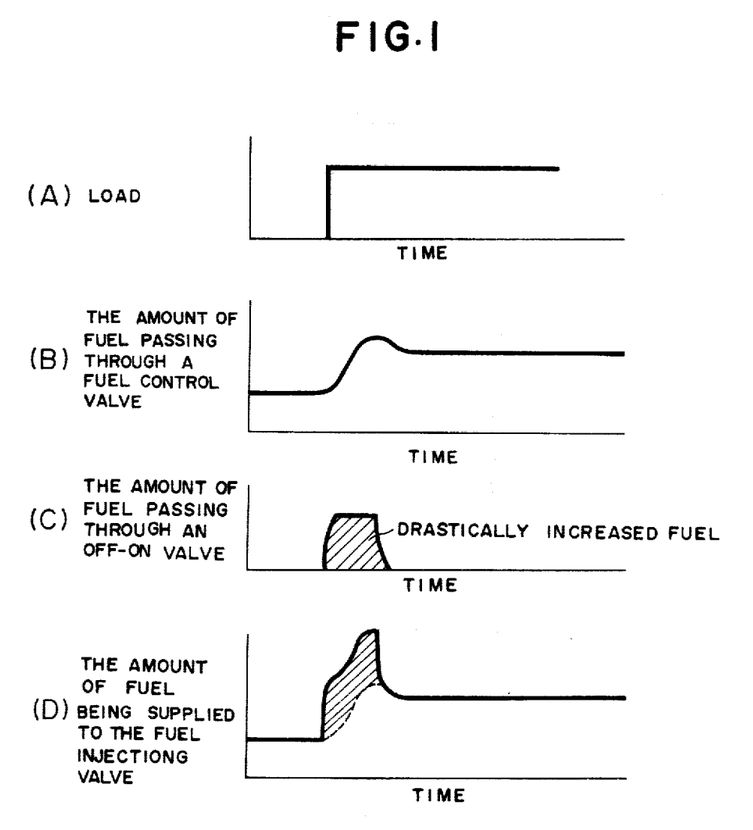
FIG. 1 is a timing chart showing the operation of an fuel control device according to the prior art.

FIGS. 1 (A) through (D) shows these conditions. Namely, when the load increases as shown in FIG. 1 (A), the amount of fuel passing through the fuel control valve varies as shown in FIG. 1 (B). In this case, the amount of fuel passing through the ON-OFF valve varies as shown in FIG. 1 (C). However, as shown in FIG. 1 (D), a peak of the fuel flow is produced just before the closing of the ON-OFF valve, and thus the fuel amount supplied to the injection valve causes the turbine to be entered into surge limit.

By contraries, when trying to suppress the peak so as not to enter the surge zone, the most effective amount of the fuel will be supressed just after or before the abrupt increase of the load, for the purpose of preventing the lowering of the number of rotation of the output turbine shaft because of the necessity of reducing the amount of the fuel passing through the ON-OFF valve.

SUMMARY OF THE INVENTION

It is therefore an object of the present invention to provide a new and improved fuel control system which is free from the above problems.

It is another object of the present invention to provide a fuel control system in which the flow of fuel passing through the fuel control valve is maintained substantially constant while the ON-OFF valve is opening at the time of abrupt increase of the load.

It is further object of the present invention to provide a fuel control system having a holding means for generating a control signal for maintaining the amount of fuel passing through the fuel control valve provided in the main fuel path nearly constant.

In accordance with one feature of the present invention, the fuel control system comprises holding means and control means connected to the holding means for providing a first signal in response to a signal corresponding to the difference between the set rotational speed and the actual number of rotation of an output turbine shaft.

The system also comprises load condition detecting means which produces a second signal when the abrupt condition of the load exceeds a predetermined level, and which signal being applied to an ON-OFF valve for controlling the opening and closing of the same valve.

These and other objects and advantages and features of the invention will be apparent from the following description taken in conjunction with the accompanying drawings.

DESCRIPTION OF THE PREFERRED EMBODIMENTS

Figure 2:
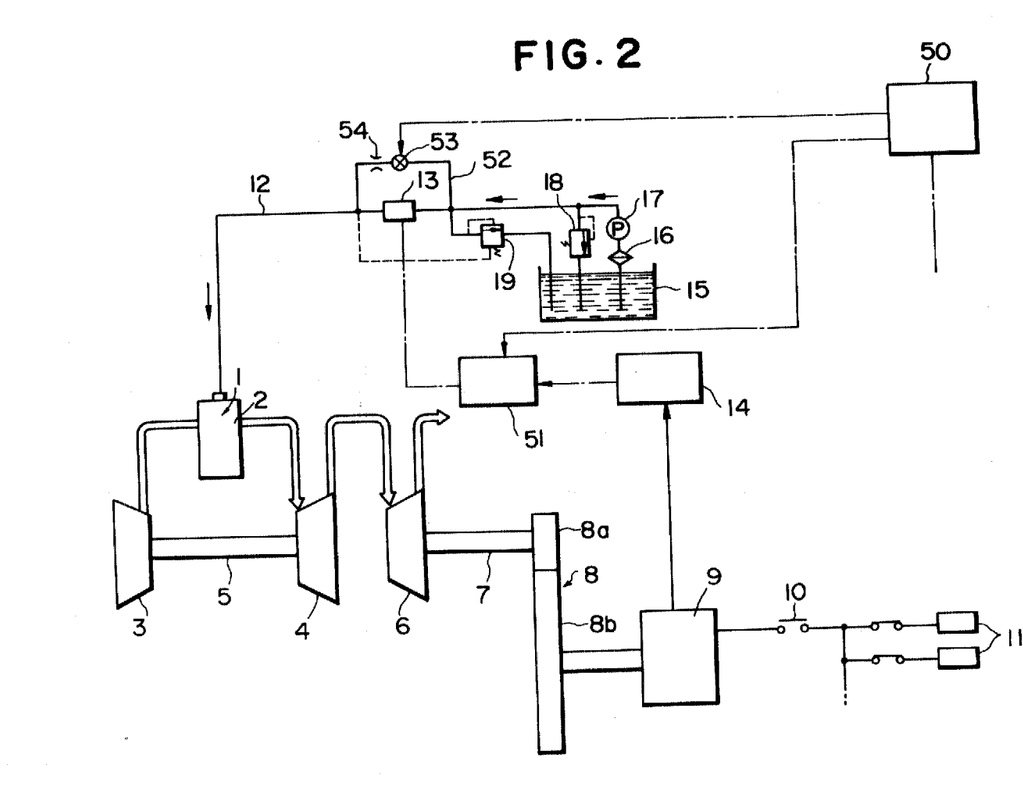
FIG. 2 shows the general construction of the fuel control system according to the present invention.

Referring to FIG. 2, there is illustrated one embodiment of a fuel control system made in accordance with the present invention. The system comprises a fuel injection valve 1, a combustion chamber 2, a compressor 3, a compressor turbine 4, a gas generator shaft 5, and an output turbine 6. Fuel is supplied from the fuel injection valve 1 into combustion chamber 2 where it is burnt with compressed air supplied therein from the compressor 3 to produce high temperature and high pressure gases. The produced gases rotate the compressor turbine 4. The rotation of the compressor turbine 4 is transmitted through the gas generator shaft 5 to the compressor 3 which is driven thereby. The produced gases are also introduced into the output turbine 6 and then discharged from the system directly or through a heat exchanger, if necessary.

The system further comprises a deceleration mechanism or a reduction gear 8 having gears 8a, 8b. A generator 9 is provided to which the power output from the turbine 6 is transmitted via the reduction gear 8 through the output turbine shaft 7 to drive said generator 9. The generator 9 is connected to a load 11 through a switch 10. In the main fuel path 12, there is provided a fuel control valve 13 controlled by a control device 14, and this fuel flow from a fuel tank 15 to the injection valve 1 is controlled by the control valve 13. The reference numeral 16 indicates a filter, the numeral 17 indicates a pump and the numeral 18 denotes a relief valve. The system shown in FIG. 2 further comprises a sub-fuel path 52 which bypasses the fuel control valve 13 and in the sub-path 52 there is provided an ON-OFF valve 53 which functions as described later. The reference numeral 54 shows a restricting orifice. The feature of the present invention resides in that the system comprises a control device 14 connected to the generator 9, a holding device 51 which controls the fuel control valve 13, and a load condition detecting device 50 which produces an output signal for controlling the ON-OFF valve 53 and the holding device 51 when an abrupt increase of the load which exceeds a predetermined level occurs.

In operation, the fuel injected from the injection valve 1 is burnt with air supplied from the compressor 3 in the combustion chamber 2 and produces burnt gas of high temperature and high pressure. The burnt gas thus produced rotates the compressor turbine 4 as well as driving the compressor 3 through the gas generator shaft 5, and then it enters in the subsequent output turbine 6 so as to rotate the output turbine 6 and is ejected from the machine. In this case, the gas may be ejected through a thermal exchanger, not shown, if desired. The output power from the output turbine 6 is transmitted to the reduction device 8 having gears 8a and 8b through the turbine shaft 7 so that the generator 9 is driven. In order to maintain the frequency of the electric power constant which is supplied from the generator 1 to the load 11 through the switch 10, e.g. 50 cycles, it is necessary for the rotational speed of the turbine shaft to be maintained at a predetermined level; e.g., 25,000 rpm. For this purpose there is provided in this invention the control device 14 in which the rotational speed of the output turbine shaft 7 is converted into a rotational speed signal, e.g. an analog signal N, by, for instance, a pulse pick-up tacho-generator provided in the generator, and a control signal (hereinafter referred to CVset) is produced for setting the opening of the fuel control valve 13 provided in the fuel path 12, based on the difference N=Nm−N between the rotational speed signal and a signal Nm which corresponds to the set rotational speed of the output turbine shaft 7.

Figure 3:
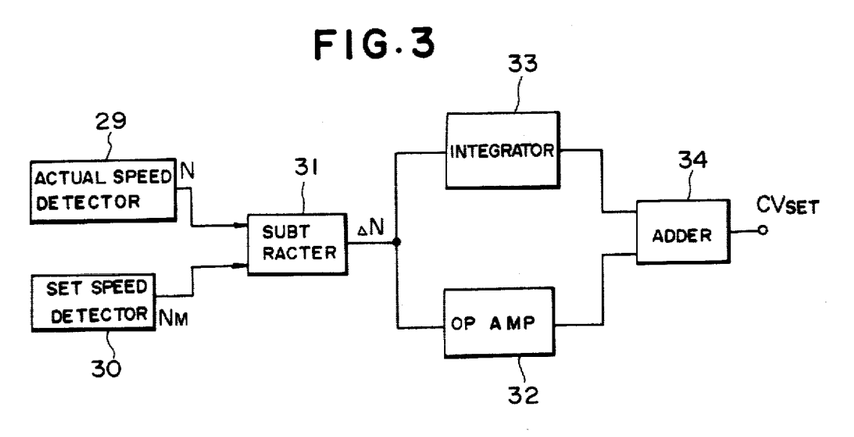
FIG. 3 shows the detailed construction of the control means of FIG. 2 according to the invention.
Figure 4:
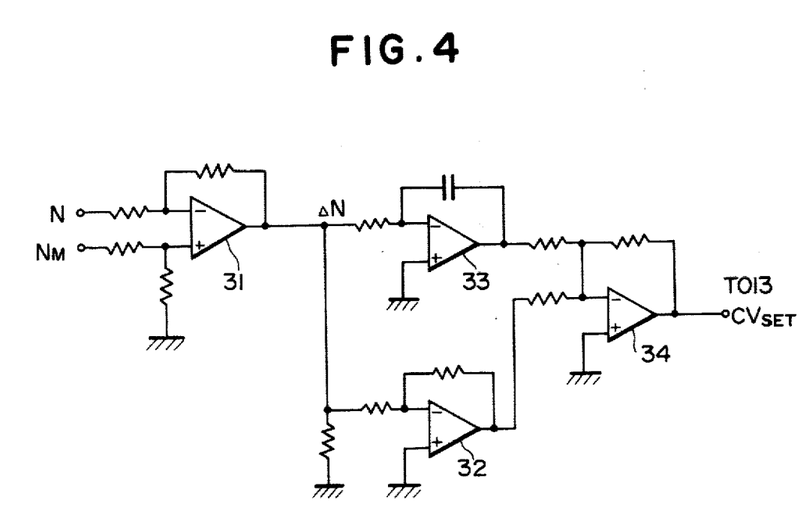
FIG. 4 is a circuit diagram of the control means of FIG. 3 according to the invention.

The control device 14 comprises, as shown in FIG. 3 and FIG. 4, an output means 29 such as a pulse pick-up means for producing the signal N which corresponds to the actual rotational speed of the engine, a means 30 for producing the signal Nm which corresponds to the rotational speed of the engine, a subtractor 31, an operational amplifier 32, an integrator 33, and an adder 34.

The fuel in the fuel tank 15 is pressurized by the fuel pump 17 after being filtered through the filter 16 and is supplied to the fuel control valve 13 after regulation of its pressure by the relief valve 18. Since the pressure differential existing across the fuel control valve 13 is held constant by the pressure difference adjusting valve 19, the amount of the fuel supplied to the fuel injection valve 1 is controlled in accordance with the opening of the fuel control valve 13. The fuel control valve 13 has normally a delay in its mechanical response, as the valve 13 is driven by a servo-motor. For the purpose of ameliorating the delay, there are provided in the system shown in FIG. 2 the sub-fuel path 52 which bypasses the fuel control valve 13, and which is controlled by the electromagnetic ON-OFF valve 53 which is provided in the sub-fuel path 52.

The electromagnetic ON-OFF valve 53 is normally in the closed condition and it is opened by an instruction signal from the load condition detecting device 50 when a drastic increase of the load is detected thereby, thus rapidly increasing the amount of the fuel supplied to the fuel injection valve 1 through the sub-fuel path 52 through the orifice 54. In such a way described above, the fuel flow rapidly increases. However, in order to prevent the peak of the increase from being delayed, and to prevent the turbine from being entered into a surge limit, there is provided according to the present invention, the holding device 51 which maintains the fuel amount passing through the fuel control valve 13 approximately constant when such a drastic increase of the load occurs.

Figure 5:
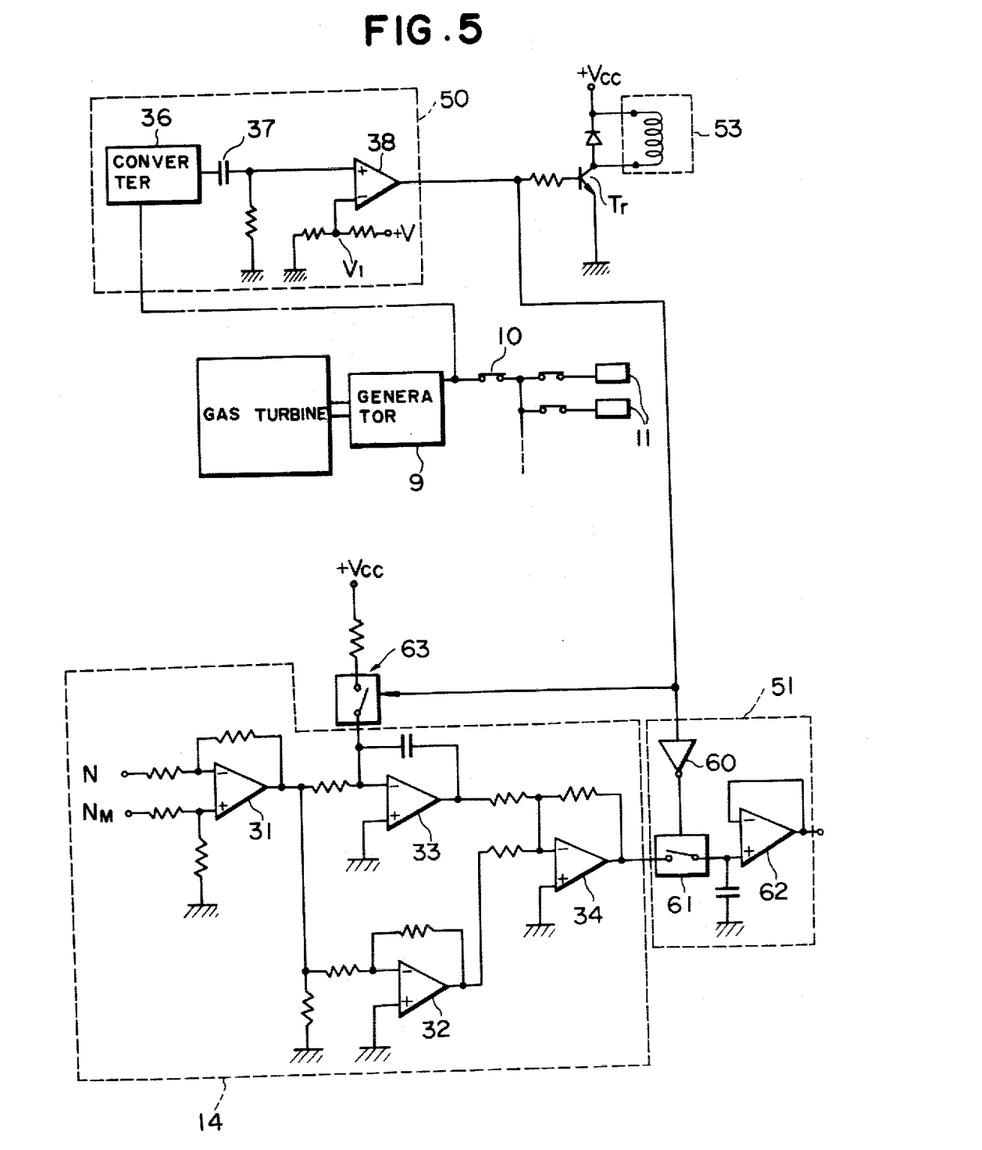
FIG. 5 is an detailed circuit diagram of some portions of FIG. 1 according to the invention.
Figure 6:
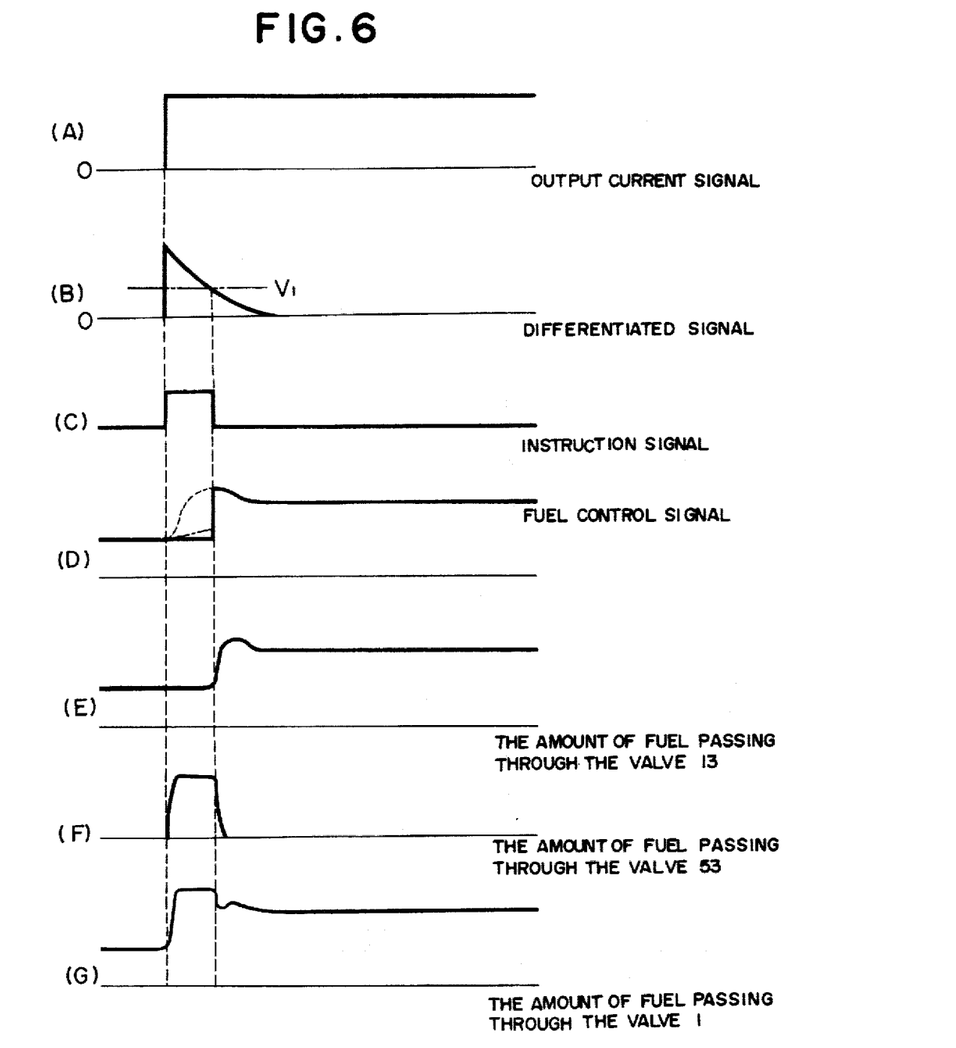
FIG. 6 is a timing chart of the operation of the system of FIG. 2 according to the present invention.

The practical construction of the control device 14, the load condition detecting device 50, and the holding device 51 are shown in the FIG. 5. In the FIG. 5, the load condition detecting device 50 comprises a converter 36 for converting the output current from the generator into an analog voltage signal, a differentiating circuit 37 consisting of a capacitor C and a resistor R with a relatively large time constant for differentiating the analog signal, and a comparator 38 for comparing the differentiated signal with a predetermined positive voltage V1. Thereby the instruction signal or the second signal is produced only during the time when the differentiated signal exceeds the predetermined positive voltage V1, at the time of drastic increase of the load, as shown in FIGS. 6(A), (B) and (C). Namely, the instruction signal is derived as shown in the FIG. 6 (C) when the differentiated signal exceeds the reference voltage V1 as shown in FIG. 6 (B) in accordance with the change in the output current signal as shown in FIG. 6 (A).

The instruction signal renders the transistor Tr operative to open the ON-OFF valve 53, thereby increasing the fuel abruptly being injected from the fuel injection valve 1. This instruction signal is also applied to the holding device 51.

The holding means 51 comprises an inverter 60 which inverses the instruction signal, a normally open relay 61, and a memory 62 consisting of a capacitor C2 and a buffer amplifier OP. In this circuit, when no instruction signal is applied thereto, the relay 61 is closed so that the output from the fuel control device 14 is output to the fuel control valve 13 from the memory 62. However, when the instruction signal is applied thereto, the relay 61 is opened and the output from the fuel control device 14 in this case is stored in the memory 62, with the result that the stored value is output to the fuel control valve 13. Accordingly, while the instruction signal is applied to the ON-OFF valve so that the amount of fuel being injected rapidly increases, the degree of the opening of the fuel control valve 13 is held constant so that there is no possibility that the turbine is entered into the surging limit due to such a rapid increase in the amount of fuel injected. These conditions are shown in FIGS. 6 (C) through (G).

Moreover, a correcting circuit 63 having a power supply, resistors, and an relay which is closed by the application of the instruction signal, corrects the output from the integrator 33 when the fuel is drastically increasing, thus improving the response of the fuel control device 14 after closing of the valve 53. This condition is shown in the FIG. 6 (D) by the dotted and dashed segment.

Figure 7:
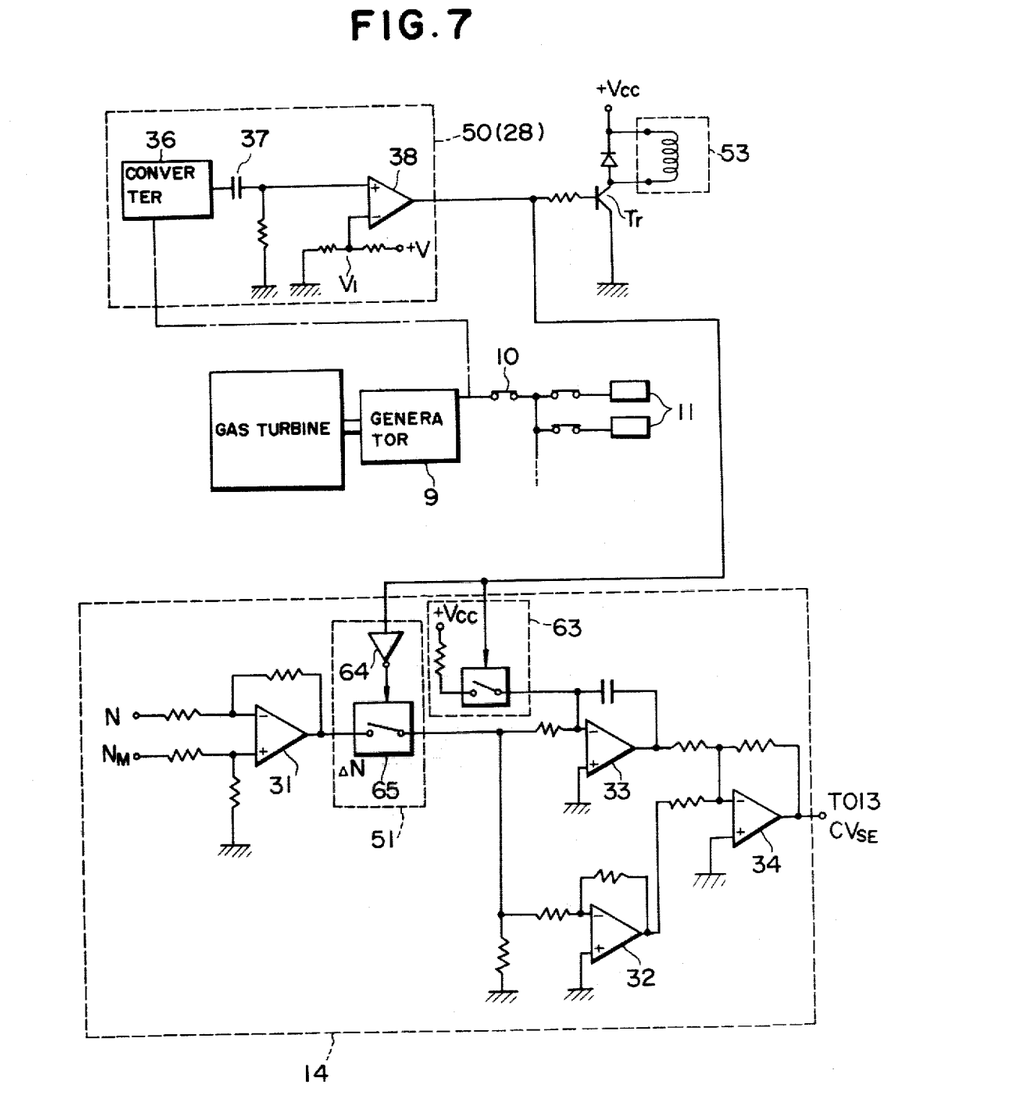
FIG. 7 shows another embodiment of the circuit of FIG. 5 according to the present invention.

In FIG. 7, there is shown another embodiment of the circuit shown in FIG. 5 according to the present invention. In this embodiment, the construction thereof is the same as that shown in FIG. 5 except for the holding means 51. In this case, the holding means 51 comprises an inverter 64 for inverting the instruction signal, and a relay 65 provided between the subtractor 31 and integrator 33 of the fuel control device 14 and closed by the output from the invertor 64. Accordingly, when the instruction signal is input, the relay 65 opens so that the signal from the subtractor 31 is no longer supplied to the integrator 33. As a result, the fuel control signal is approximately maintained constant. In this case, the fuel control signal slowly increases because of the correction by the correcting circuit 63. With this construction, when the fuel is drastically increasing, the opening of the fuel control valve 13 is maintained nearly constant so that the turbine cannot be entered into the surging limit.

Figure 8:
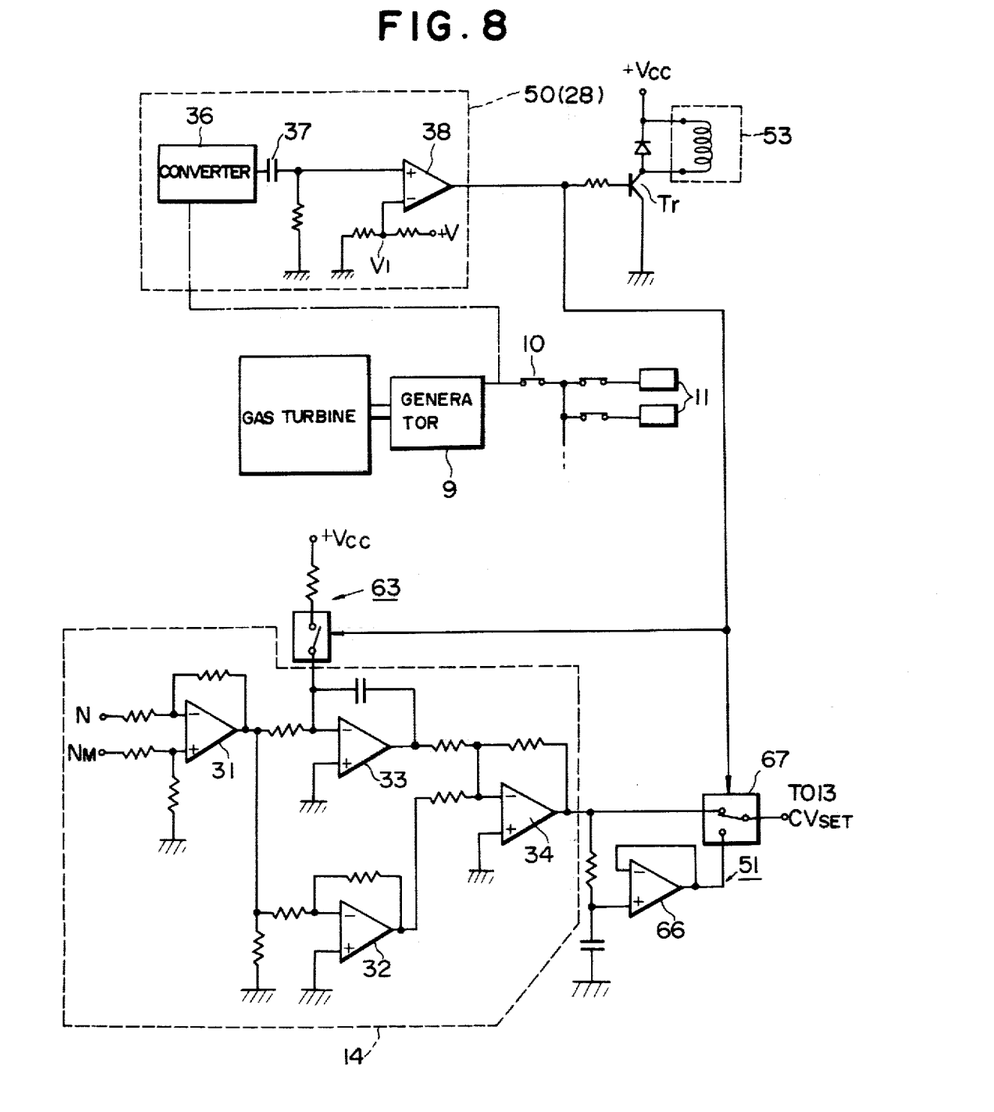
FIG. 8 shows another modification of the circuit of FIG. 5 according to the present invention.

FIG. 8 shows another embodiment, similar to FIGS. 5 and 6, according to the present invention. The system shown in FIG. 8 comprises an averaging circuit 66 for averaging the output from the fuel control device 14 and a change-over switch 67 for applying the instruction signal to the averaging circuit 66 whenever it is inputted to the system. The construction of the circuit is almost the same as that shown in FIG. 5 except for the holding means 51. Accordingly, when the fuel supply is drastically increased by application of the instruction signal thereto, the signal having a value equal to the mean value of the output from the fuel control device 14 is outputted to the fuel control valve 13 so that the amount of fuel passing through the valve 13 can be maintained nearly constant during the drastic increase of the fuel.

In the embodiments described above, the fuel passing through the fuel control valve 13 is maintained nearly constant by maintaining the fuel control signal nearly constant, when the instruction signal is provided. However, it is also possible to provide in the main fuel path a cut-off valve for cutting off the fuel passing through the control valve 13 which is closed by the instruction signal. However, in this case it is required that the fuel flow through the sub-fuel path 13 should be present so as to obtain the optimum flow of the fuel.

As described in the foregoing, in the system according to the present invention, entering of the engine into the surging region can be prevented by maintaining the fuel amount passing through the fuel control valve nearly constant even when the amount of fuel drastically increases. In addition, a striking effect is obtainable in that the lowering of the rotational speed of the output turbine shaft due to a drastic increase of the load can be kept small.

It is to be understood that the invention is not to be limited to the embodiments described in the foregoing and that various changes and modifications may be made without departing from the spirit and scope of the invention as defined in the appended claims.

I claim:

1. For a gas turbine comprising an output shaft and a fuel injection valve which is supplied with fuel from a fuel tank via a fuel supply passage, a fuel control system, comprising:
   a load detector, which produces a first signal representative of the load on the turbine output shaft;
   a rotational speed detector, which produces a second signal representative of the rotational speed of the turbine output shaft;
   a main fuel control valve, located in the fuel supply passage;
   an ON/OFF control valve, which is normally in the "OFF" state, and which bypasses the main fuel control valve and leads from the upstream to the downstream thereof; and
   a control means which receives said second signal and controls the degree of opening of the main fuel control valve depending upon the difference between said second signal and a set reference value; characterized in that there is provided;
   a holding means, which receives said first signal, and, when and only when its rate of increase is larger than a predetermined value, (a) opens the ON/OFF valve, and (b) interrupts the control of the main fuel control valve by the control means, maintaining the opening of the main control valve substantially at its value before said interruption.

2. A fuel control system as defined in claim 1, wherein said ON-OFF valve is also controlled by the second signal from the load condition detecting means in accordance with abrupt increase of the load.

3. A fuel control system as defined in claim 1, wherein the ON-OFF valve is normally closed and is opened by the second signal from the load condition detecting means so as to bypass the sub-fuel path when the abrupt increase of the load occurs.

4. A fuel control system as defined in claim 1, wherein said holding means comprises a memory for storing the output from the control means.

5. A fuel control system as defined in claim 1, wherein said load condition detecting means comprises a comparator for comparing the first signal with a predetermined level and for producing the second signal when the first signal exceeds the predetermined level.

6. A fuel control system as defined in claim 1, which further comprises a pressure difference adjusting valve provided upstream of the fuel control valve for controlling a pressure difference the upstream and the downstream of the control valve.

* * * * *